L. S. SKELTON.
GLASS DRAWING POT.
APPLICATION FILED JUNE 9, 1917.

1,258,159.

Patented Mar. 5, 1918.

Inventor
L. Sherman Skelton

By C. C. Hines,

Attorney

UNITED STATES PATENT OFFICE.

LEVI SHERMAN SKELTON, OF OKMULGEE, OKLAHOMA.

GLASS-DRAWING POT.

1,258,159.

Specification of Letters Patent.

Patented Mar. 5, 1918.

Application filed June 9, 1917. Serial No. 173,799.

*To all whom it may concern:*

Be it known that I, LEVI SHERMAN SKELTON, a citizen of the United States, residing at Okmulgee, in the county of Okmulgee and State of Oklahoma, have invented new and useful Improvements in Glass-Drawing Pots, of which the following is a specification.

This invention relates to improvements in drawing pots or rings of the type employed in glass drawing apparatus, for confining a portion of the molten glass from which the cylinder is directly drawn, and more particularly to drawing pots or rings of the floating type movable over the surface of the glass between the tank and drawing opening, so that after the cylinder has been drawn the pot may be moved back into the melting tank and the aftermath melted and drained out, so that on the movement of the pot back into drawing position a fresh and pure charge of glass will be presented for the subsequent drawing operation.

The object of the present invention is to provide a drawing pot or ring of the character described which embodies simple, reliable and efficient means for preventing loss of heat and chilling of the glass below the pot when the latter is in drawing position, for adapting the pot to float at a predetermined normal level, and for creating a circulation to effect the withdrawal by suction of the melted aftermath from the pot, to insure the entry into the pot of a fresh charge of glass free from impurities.

The invention consists of the features of construction, combination and arrangement of parts, hereinafter fully described and claimed, reference being had to the accompanying drawing, in which:—

Figure 1:
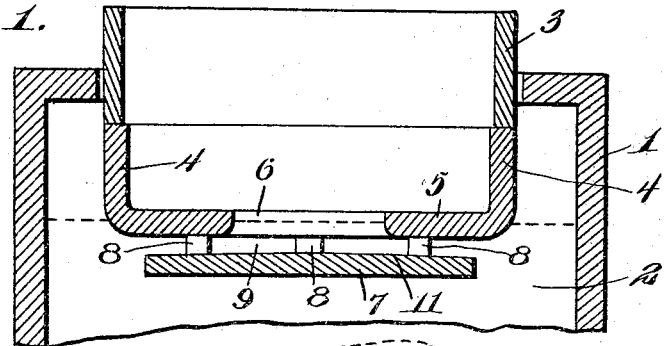
Figure 1 is a vertical section through a glass reservoir, shield and a drawing pot embodying my invention, showing the pot in normal floating position, prior to depression.

Referring to the drawing, 1 designates a dog house or other receptacle containing the main charge 2 of molten glass from which the cylinders are to be drawn, and 3 designates a tubular shield or water jacket such as is commonly employed for protecting the drawing pot, the surface of the glass and the lower portion of the cylinder to a greater or less extent from the chilling effects of the air.

In carrying my invention into practice, I provide a drawing pot or ring 4 made of fire-clay or other suitable material of less specific gravity than the molten glass so that the pot is adapted to float upon the surface of the glass for transferal back and forth between the furnace tank and the receptacle 1 at the drawing station. This pot comprises a cylindrical body having a bottom 5 formed with a combined glass inlet and drain outlet opening 6. This opening 6 is of considerably less diameter than the body of the pot, and arranged beneath the bottom 5 of the pot is a horizontally disposed baffle plate or disk 7, which is circular in form, of somewhat less diameter than the pot body but of greater diameter than the opening 6.

The disk 7 is supported in spaced relation to the bottom 5 by a series of spaced lugs or uprights 8, and so arranged as to form a channel 9 between its upper surface and the lower surface of the bottom 5, which channel is provided for the circulation of the glass in the filling and emptying of the pot and to facilitate the operation of draining the pot of the melted aftermath, as hereinafter described.

Figure 2:
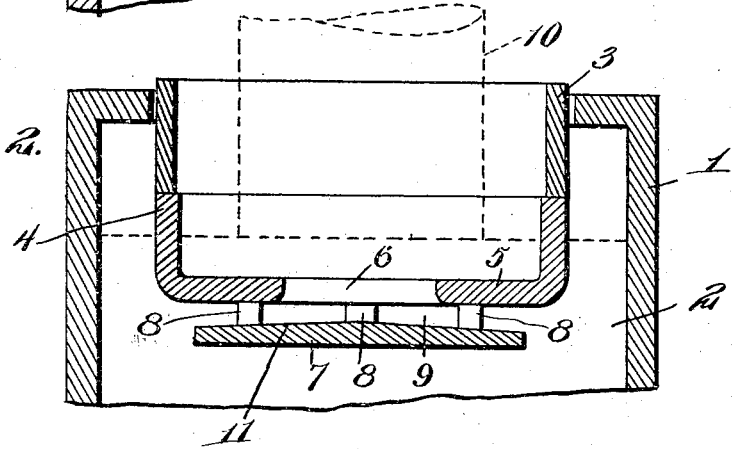
Fig. 2 is a similar view showing the pot depressed for drawing action in the production of a cylinder.
Figure 3:
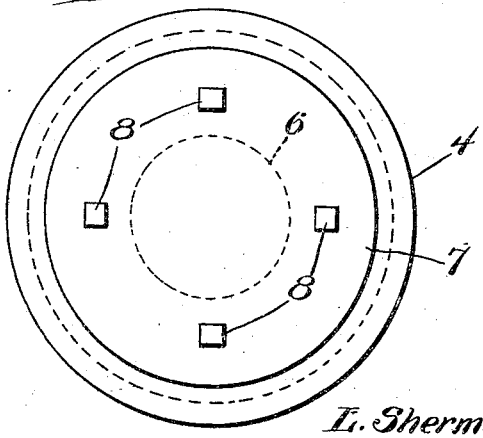
Fig. 3 is a top plan view of the drawing pot.

The disk 7 is preferably made of the same material as the pot, and forms a flotation medium which adapts the pot to float at a comparatively high level, such a level that the surface of the bottom 5 of the pot normally lies in the plane or slightly below that of the surface of the glass 2, as shown in Fig. 1, to effect the complete drainage of the aftermath from the pot. The pot is adapted to be depressed during the drawing action by a downward movement of the shield 3, to the position shown in Fig. 2, whereby the pure glass from the bath 2 will be forced upwardly through the channel 9 and opening 6 into the pot to the level indicated to supply a charge of glass within the pot for the production of the cylinder 10. As shown, the upper surface 11 of the disk 7 is preferably of convex form, being highest at the center in the axial line of the opening 6 and thence sloping in all directions toward its peripheral edge to provide for the free drainage off of the aftermath in the clearing of the pot of the refuse material.

The disk 7 by reason of its arrangement described also serves as a non-conducting barrier between the charge of glass in the pot or between the atmosphere and the body of glass 2 in the dog house, to reduce loss of heat from the body of glass 2 as well as the chilling effect of the air at the drawing opening upon such body of glass, thus keeping the glass at the drawing station at the proper temperature and reducing to a large extent liability of chilling of the glass with its deleterious consequences. In the drawing operation the disk furthermore serves as a means for preventing undue fluctuations of temperature between the body of glass 2 and the charge of glass in the pot. A further function of the disk is that it serves as a drag to cause a flow of the glass through the channel 9 when the pot is moved from the tank into drawing position for use, the current of molten glass thus established producing a suction whereby the melted aftermath or residue contained in the pot will be positively drawn outward and discharged.

It will be understood that after the cylinder is drawn the pot containing the residue of glass is moved back into the tank, whereby the aftermath contained in the pot is subjected to the high temperature of the tank and melted. When the pot is again drawn back into the dog house for subsequent use, the motion of the baffle 7 through the body of glass 2 causes a current to flow through the channel 9, and this current induces suction on the melted aftermath contained in the pot, whereby all the melted refuse glass within the pot is drawn back into the tank to be re-purified. Thus when the pot is brought into drawing position it will have been fully emptied of all impure glass, so that upon its depression it will be filled with a fresh charge of pure glass preparatory to the production of a perfect cylinder therefrom.

Having thus fully described my invention, I claim:

1. A floatable drawing pot comprising an annular body having an opening in the bottom thereof, and a baffle disk carried by and disposed beneath the pot in spaced relation to said opening.

2. A floatable drawing pot comprising an annular body having an opening in the bottom thereof, and a baffle disk carried by and disposed beneath the bottom of the pot and in spaced relation thereto, said disk being of greater diameter than said opening.

3. A floatable drawing pot comprising an annular body having an opening in the bottom thereof, and a baffle disk carried by and disposed beneath the bottom of the body in spaced relation thereto, said disk being of less diameter than the pot and of greater diameter than said opening.

4. A floatable drawing pot comprising an annular body having an opening in the bottom thereof, and a baffle disk supported from the bottom of the pot upon the underside thereof in spaced relation to said opening, said disk being of greater diameter than the opening and having its upper surface sloping from its center to its peripheral edge.

5. A floatable drawing pot comprising an annular body having an opening in the bottom thereof, a circular disk disposed beneath the bottom of the pot in spaced relation thereto, said disk being of greater diameter than said opening, and connecting elements between the disk and bottom of the pot and connecting the same in spaced relation.

In testimony whereof I affix my signature.

L. SHERMAN SKELTON.

Copies of this patent may be obtained for five cents each, by addressing the "Commissioner of Patents, Washington, D. C."